(12) United States Patent
Gargi

(10) Patent No.: US 6,915,489 B2
(45) Date of Patent: Jul. 5, 2005

(54) IMAGE BROWSING USING CURSOR POSITIONING

(75) Inventor: Ullas Gargi, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 486 days.

(21) Appl. No.: 09/819,326

(22) Filed: Mar. 28, 2001

(65) Prior Publication Data

US 2002/0140746 A1 Oct. 3, 2002

(51) Int. Cl.$^7$ ............................................... G09G 5/00
(52) U.S. Cl. ........................ 715/790; 715/855; 715/766; 715/767; 715/783; 715/802
(58) Field of Search ................................. 345/810, 817, 345/819, 820, 845, 846, 856–862, 790–794, 797, 802, 803, 808, 781, 783, 786–787, 759, 788, 764–768; 715/855, 856, 759, 797, 764–768, 781, 783, 786–788, 802, 803, 790, 808

(56) References Cited

U.S. PATENT DOCUMENTS

| | | | | |
|---|---|---|---|---|
| 4,819,189 A | * | 4/1989 | Kikuchi et al. ............. 345/797 |
| 5,283,864 A | | 2/1994 | Knowlton | |
| 5,377,317 A | * | 12/1994 | Bates et al. ................. 345/789 |
| 5,621,906 A | | 4/1997 | O'Neill et al. | |
| 5,682,511 A | * | 10/1997 | Sposato et al. ............. 345/716 |
| 5,721,853 A | | 2/1998 | Smith ......................... 395/353 |
| 5,828,371 A | | 10/1998 | Cline et al. | |
| 5,835,088 A | * | 11/1998 | Jaaskelainen, Jr. .......... 345/803 |
| 5,905,992 A | | 5/1999 | Lucas et al. | |
| 5,943,679 A | * | 8/1999 | Niles et al. ................. 715/526 |
| 6,006,227 A | * | 12/1999 | Freeman et al. ............... 707/7 |
| 6,067,086 A | | 5/2000 | Walsh ......................... 345/347 |
| 6,133,914 A | * | 10/2000 | Rogers et al. ............. 345/661 |
| 6,300,951 B1 | * | 10/2001 | Filetto et al. ............... 345/797 |
| 6,360,116 B1 | * | 3/2002 | Jackson et al. ............. 600/427 |
| 6,523,048 B2 | * | 2/2003 | DeStefano .................. 715/526 |
| 6,590,586 B1 | * | 7/2003 | Swenton-Wall et al. .... 345/730 |
| 6,638,313 B1 | * | 10/2003 | Freeman et al. ......... 715/500.1 |
| 6,768,999 B2 | * | 7/2004 | Prager et al. ............... 707/102 |

FOREIGN PATENT DOCUMENTS

WO     WO01/07996     1/2001

OTHER PUBLICATIONS

Richard Mander et al.; "A 'Pile ' Metaphor for Supporting Casual Organization of Information" Proceedings of the Conference on Human Factors in Comuting Systems Reading Addison Wesley, US May 3, 1992 pp. 627–634.

* cited by examiner

*Primary Examiner*—Raymond J. Bayerl
*Assistant Examiner*—Tadesse Hailu

(57) ABSTRACT

Image browsing through memory-stored items, such as a library of images or desktop windows, is efficiently performed by arranging images in partially overlapping fashion and generating a second-level image for each overlapped image that is contacted by a user-manipulated cursor. The second-level image is a "transitory" image, since it is removed as soon as the cursor is displaced from the corresponding first-level image. Thus, by placing the first-level images in a diagonally extending stack, straight line movement of the cursor will initiate a sequential presentation of transitory images for the images in the stack. In one embodiment, the display also includes an incrementing icon and a decrementing icon that are employed to provide substitute stacks. Moreover, a third-level image is formed in a separate window when the user selects one of the images from the stack. This third-level image has more permanency, since it remains in the display window after the stack has been substituted. The images may be digital photographs, but other applications are contemplated.

17 Claims, 8 Drawing Sheets

IMAGE BROWSING USING CURSOR POSITIONING

TECHNICAL FIELD

The invention relates generally to computer browsing through images and more particularly to providing a low impact means for viewing the display information of memory-stored items such as digital image files or computer desktop windows.

BACKGROUND ART

Digital cameras have a memory capacity that allows storage of a much larger number of images than conventional film-based cameras. As another advantage, some digital cameras permit a folder system to be created for organizing internally stored digital images. For example, one folder may be designated as "Vacation" and another folder may be designated as "Family Gathering." Images can then be organized in a manner determined by the user. However, if a folder contains a large array of images, searching for a particular image may become tedious.

The difficulty in identifying a particular image is compounded when the image files stored on the digital camera are downloaded to a computer system having image files that were previously downloaded from the same or a different digital camera or from another source of image files (e.g., the global communications network referred to as the Internet). With each such download of image files, there is a decreasing likelihood that a user will be able to remember the storage locations of individual images, even if the user carefully labels folders and the images. For example, there may be ten pictures of sunsets that are difficult to distinguish without opening the image files. Thus, a user may open all ten image files before the desired picture is identified. Without careful organization and labeling, the user may be required to open far more files in order to identify a particular picture.

FIG. 1 is an illustration of a graphical user interface (GUI) 10 that reduces the difficulty in browsing through stored images. Rather than opening each image using an application program that enables complex manipulations, such as image cropping or zoom, the images may be displayed in a dedicated viewing window 12 that is adjacent to the menu window 14 in which folders and files are listed. In FIG. 1, a folder 16 has been opened to reveal that there are five available image files. As is well known in the art, a display icon (or cursor) 18 can be used in the opening and closing of folders. A computer mouse controls the movement of the display icon along the graphical user interface, which is presented on a display, such as the screen of a computer monitor. The display icon may also be manipulated using a trackball or similar device. In the use of a computer mouse, the display icon 18 is positioned over the folder 16 and "clicked" in order to open the folder. After the folder is opened, the icon can be relocated to one of the image files in order to present the stored image within the viewing window 12. Thus, by positioning the icon to "contact" the file name "PERSON," and clicking, the image 20 of a person positioned in a chair appears within the viewing window. If the image is the desired image, the file may be opened within the more sophisticated application program.

While the browsing approach described with reference to FIG. 1 provides an improvement over a requirement of initially opening each image file within the sophisticated application program, the process is still often tedious to the user. Moreover, the repetitive mechanics of moving the display icon 18 and clicking the computer mouse may eventually result in injury to the user.

A method for reducing the difficulty in finding a particular file (such as an image file) is described in U.S. Pat. No. 6,067,086 to Walsh. Files are divided into different categories by a user. Each category is then associated by the user with one or more graphical images, with the selection of the image being based upon providing a mnemonic device for identifying the category and for differentiating the category from other categories. For example, an image of a skier may be used to designate a "sports" image set, while an airplane image may be used to designate a "transportation" image set. The GUI arrangement of Walsh enables the computer system to display the graphical images of one or more image sets, as selected by the user, as well as to display identifications of the files associated with the displayed graphical images. For example, the file identifications may be presented in a pop-up menu, so that the user may select and activate a file by clicking on its identification in the pop-up menu. When the user activates a file, the computer system loads the appropriate application program and opens the file. While the Walsh method provides an improvement over the use of generic folder appearances, the method relies upon the organizational skills and the memory of a user. Particularly in those situations in which more than one user has access to a computer system, this reliance upon organizational skills and memory may lead to unsatisfactory results. Moreover, the viewing of multiple image files still requires the repetitive point-and-click approach.

What is needed is a method and system that reduce the tediousness of browsing through the display information of memory-stored items, such as either image files from a photograph library or opened computer desktop windows.

SUMMARY OF THE INVENTION

In accordance with the invention, the contents of files in a set of stored files are displayed as a direct result of tracking the movement of a display icon across a stack of partially overlapping images. Each image is representative of the display information (i.e., contents) of a particular file stored in non-volatile memory or a desktop window stored in volatile memory. In one embodiment, the files are digital image files.

As a first step, the stack of images is presented on a display, such as a computer monitor. The position of the display icon is controlled by a user-manipulable device, such as a computer mouse or trackball. Thus, the display icon is a cursor. Typically, the images in the stack that are perceived as being rearward images are partially covered by the images that are perceived as being forward. As a result, only the foremost image is shown in its entirety when the cursor resides in a position away from the stack. However, as the cursor is moved into perceived contact with one of the images, that image is shown in its entirety. The images in the stack may be referred to as first-level (stack level) images, with the cursor-selected image being displayed as a second-level (transitory) image. In the preferred embodiment, the second-level image is offset from the symmetry of the stack. For example, if the stack is an arrangement in which the first-level images are diagonally positioned, the second-level image is axially misaligned, but adjacent to the stack. This allows a user to browse through the images in the stack without a significant shift in eye positioning. As stated, the generations of the second-level images are directly responsive to the movement of the cursor, rather than to a combination of cursor positioning and another user-initiated designation, such as mouse clicking. By scanning the cursor across the stack in a path in which the cursor is moved into sequential alignment with the images, the second-level images are generated in a corresponding sequence.

While not critical, the method may also include forming third-level images in a window that is separate from the window in which the stack is displayed. A third-level image is generated in response to a user selection of one of the images in the stack. Thus, the second-level images are formed as a direct response of cursor positioning, while the third-level images may be formed as a combined response of cursor positioning and mouse clicking. The third-level image has more permanency and may be used for the purpose of file manipulation (e.g., file transfer) or image manipulation (e.g., image cropping).

The number of images within the stack may be fixed or may be determined by the user. If the images in the stack are a subset of the total stored images, the method preferably includes a mechanism for enabling automated stack substitutions. As one embodiment, an incrementing icon is positioned on a first side of the displayed stack and a decrementing icon is positioned on an opposite side. Merely by positioning the cursor in alignment with the incrementing icon, a second-level image is formed for each of the images in the stack, a next stack is displayed, and the process continues until the end of the collection of files is reached. A reverse pattern is followed when the cursor is positioned in alignment with the decrementing icon.

As previously stated, in one embodiment the files are image files. For example, the image files may be photographs generated by a digital camera. The invention may be practiced at the camera or at a computer to which the images are downloaded. Other embodiments are contemplated. As examples, the first-level images and second-level images may be thumbnails from different digital video clips or may be replicas of opened desktop windows. In the video clip embodiment, by selecting a thumbnail, the third-level image is presented as the clip in a play condition.

In addition to the display information, the file information may be presented when the cursor is moved in alignment with an image. The file information may include the file name, the stored location, and the file size. Where the method is implemented from a web page of the World Wide Web, the file information preferably includes the Universal Resource Locator (URL) of the web page from which the image is generated. The selection of a second-level image then launches the web page. As another possible application, the images in the stack may be display information of text files that are browsed.

An advantage of the invention is that the stack provides the images in an overlapping relationship, so that screen real estate is preserved. That is, the stack provides a compact arrangement for document browsing. Another advantage is that the browsing approach significantly reduces the tediousness of image searching. Mouse clicking is needed only when a "hit" or potential hit has been reached. Preferably, the image browsing approach allows file manipulation with regard to storage, transmission and the like. That is, without the cursor leaving the window in which the stack is displayed, the method preferably allows files to be selected for manipulation operations such as changes in folder storage.

DETAILED DESCRIPTION

Figure 1:
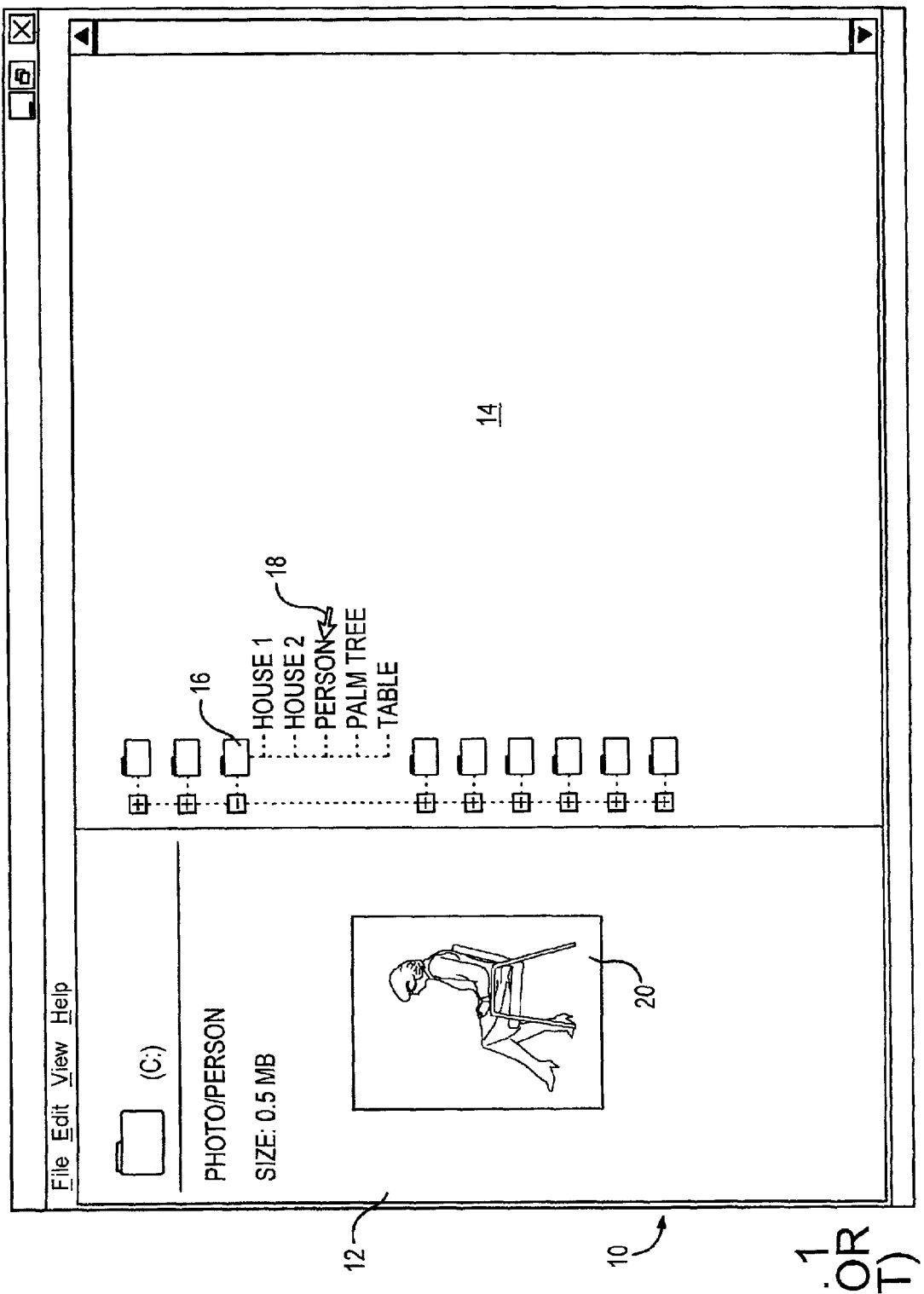
FIG. 1 is an illustration of a graphical user interface in accordance with the prior art.
Figure 2:
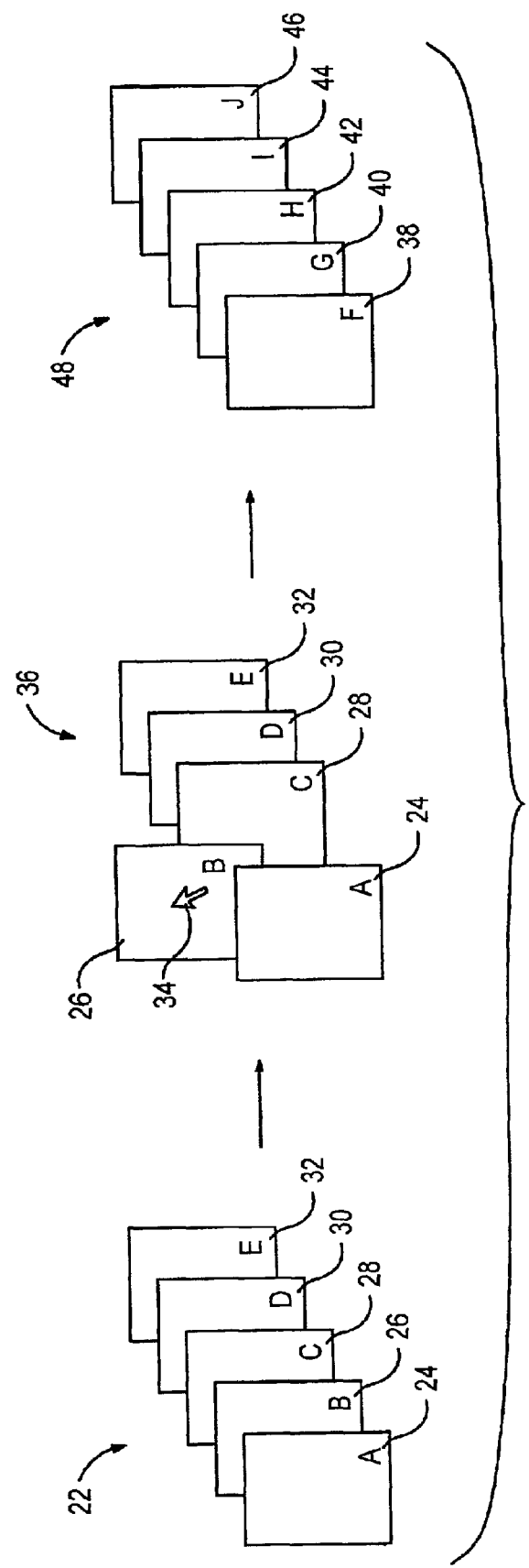
FIG. 2 is a schematic illustration of file browsing steps that are followed in accordance with the present invention.

With reference to FIG. 2, an "active cardstack" 22 is shown as having five images 24, 26, 28, 30 and 32. The images extend diagonally and provide a perception of rearward images being partially covered by forward images, so that only the foremost image 24 is shown in its entirety. Each of the images represents display information of a memory-stored item, such as image files in non-volatile memory or opened desktop windows from volatile memory (random access memory). The invention will be described primarily in the embodiment in which the memory-stored items are image files, such as digital photographs. However, other applications of the invention will be described below.

Since the active cardstack 22 is arranged such that each image 24–32 is at least partially exposed, a display icon, such as a cursor, may be moved into perceived contact with any one of the images. The images may be described as first-level images. However, when the cursor is brought into contact with one of the images, a second-level image is formed. Thus, the cardstack is a dynamic stack that is manipulated merely by movement of the cursor onto the stack. It is not necessary to "click" the device that manipulates the cursor (e.g., a mouse) or to register a keyboard keystroke. In the center portion of FIG. 2, a cursor 34 is shown as being positioned over the second image 26. This causes a second-level image to be generated in a position offset from the original position. In the embodiment that will be described with reference to FIGS. 3 and 4, the first-level image is preserved and the second-level image is shown in its entirety. Regardless of whether the approach of FIG. 2 or the approach of FIGS. 3 and 4 is utilized, the mere repositioning of the cursor causes the stack to be modified to an "activated cardstack" 36.

If the cursor 34 is scanned across the images 24–32 along a path in which the cursor is sequentially aligned with the images, a corresponding sequence of second-level images will be presented to a viewer. In this manner, each of the images 24–32 can be reviewed for content without requiring a repetitive point-and-click process.

The number of images within the original cardstack 22 may be fixed or may be selected by the user. If the number of images 24–32 is less than the total number of images that can be browsed, the preferred embodiment allows continued browsing without requiring a user input beyond the positioning of the cursor 34. For example, if the cursor 34 is located immediately to the right of the cardstack 36, as viewed in FIG. 2, the next subset of images 38, 40, 42, 44 and 46 is introduced as a second active cardstack 48. For the purpose of reducing the likelihood that a new cardstack will be introduced unintentionally, there should be a threshold time for the positioning of the cursor before the cardstack is changed. Moreover, stack-to-stack incrementing and decrementing icons may be formed to the right and left of the cardstack, respectively, as will be described with reference to FIG. 3. By positioning the cursor 34 over the decrementing icon, the cardstack 48 may be resubstituted with the original cardstack 22.

Figure 3:
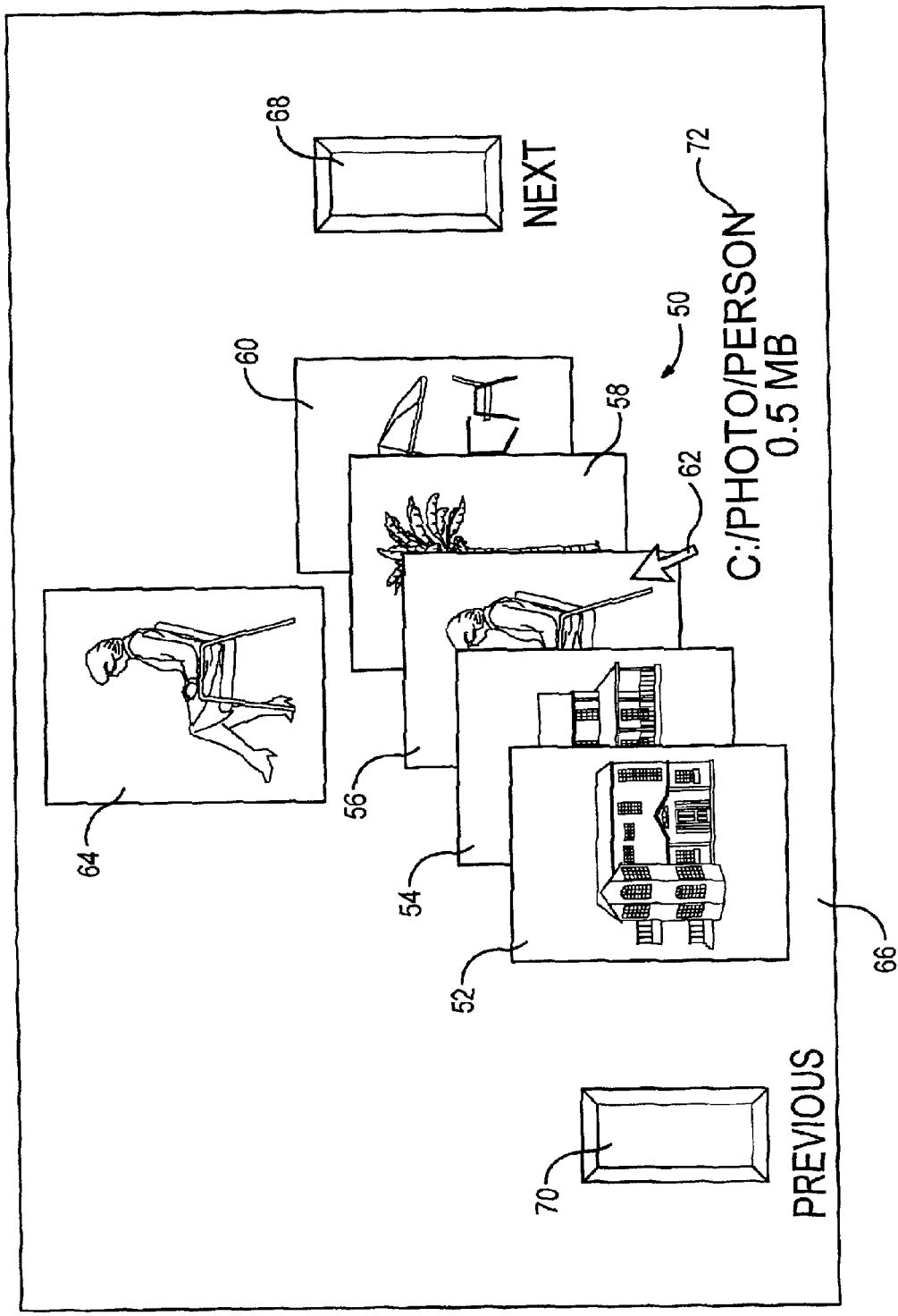
FIG. 3 is an illustration of one window of a graphical user interface for cursor-position browsing in accordance with the invention of FIG. 2.
Figure 4:
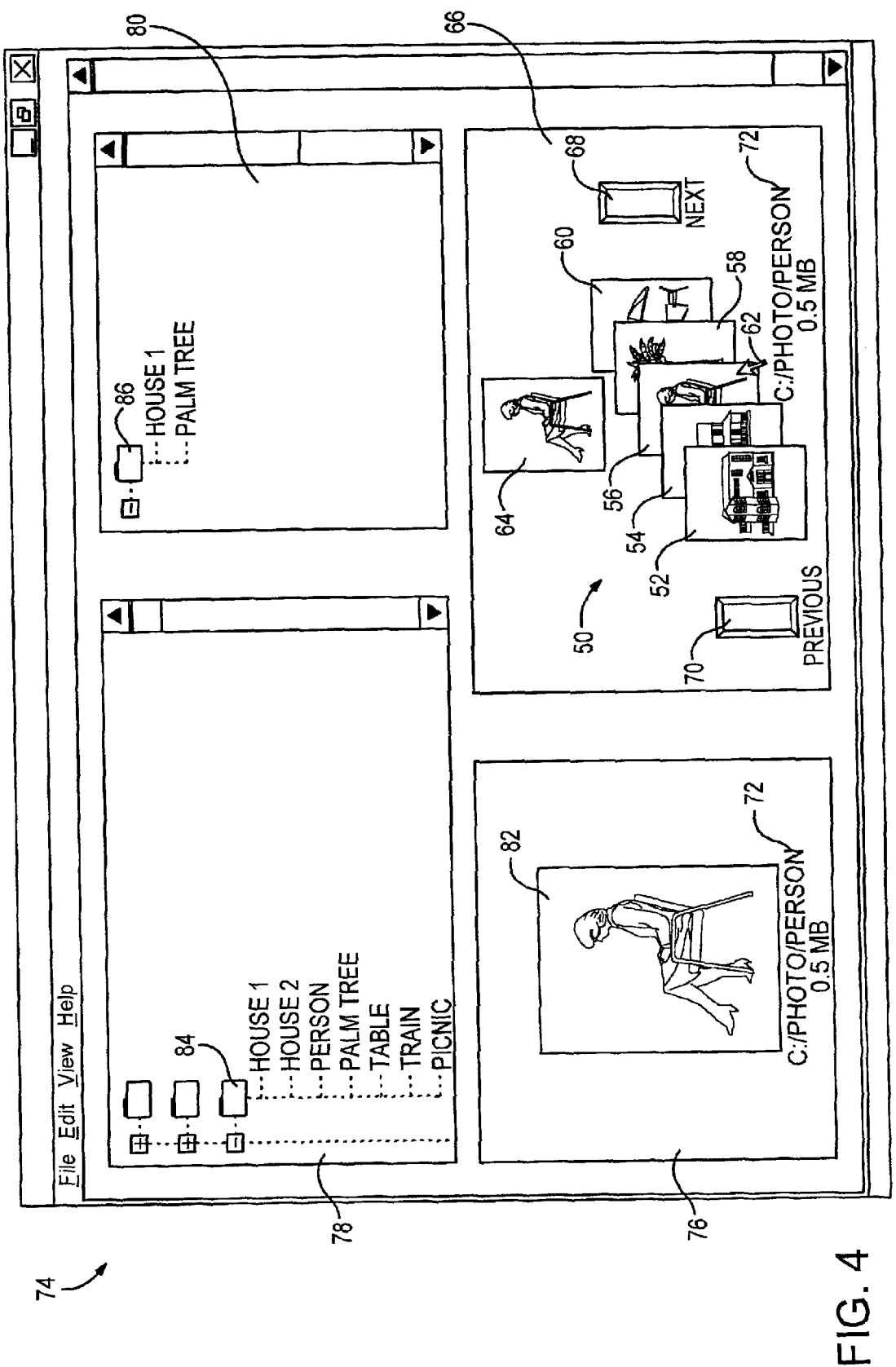
FIG. 4 is an illustration of various windows within a graphical user interface employing the techniques of FIG. 3.

Referring now to FIG. 3, a stack 50 of first-level images 52, 54, 56, 58 and 60 is shown in greater detail. A cursor 62 is in perceived contact with the center image 56, causing a second-level image 64 to be generated. Unlike FIG. 2, the second-level image 64 is shown in its entirety. This is the preferred embodiment, but is not critical. As can be seen, a sufficient portion of each first-level image 52–60 is exposed to allow a user to utilize the exposed portions as mnemonic devices. As the number of images in the stack is increased, the ratio of the exposed portion to the overlapped portion will decrease, but the value of the mnemonic aid may be increased, since there will be more images to consider.

The window 66 in which the stack 50 resides includes a stack-to-stack incrementing icon 68 and a stack-to-stack decrementing icon 70. By positioning the cursor 62 in alignment with the incrementing icon 68 for a set period of time, a second stack will be presented to the user. For example, if there are 75 digital images within a library, the entire library will be displayed in stacks of five images if the cursor is left in position along the incrementing icon 68. In the preferred embodiment, each image in a stack is displayed as a second-level image before the stack is changed. Thus, the process will scan through all 75 images in the library. The decrementing icon 70 operates in the reverse manner. Optionally, the controlling computer program is configured to allow instant incrementing or decrementing by clicking the computer mouse when the cursor 62 resides on the appropriate icon 68 or 70.

In addition to the display of the second-level image 64, positioning the cursor 62 in perceived contact with the exposed region of the first-level image 56 triggers the display of file information 72 regarding the image. The file information shown in FIG. 3 identifies the storage location and the size of the image. Other information may be included. For applications in which the images 52–60 represent web pages, the file information may be the URLs of the images.

Referring now to FIG. 4, the window 66 of FIG. 3 is shown as being a component of a graphical user interface 74 that includes three other windows 76, 78 and 80. The window 76 displays a third-level image 82 that corresponds to the images 56 and 64. While the second-level image 64 is transitory, since it is removed by moving the cursor 62, the third-level image 82 will remain after the selection of a displayed stack has been incremented forward or decremented rearward. Thus, the display within the window 76 is not based upon the current display of images within the window 66. The "loading" of an image into the window 76 can be triggered by a combination of user designations, such as cursor positioning and mouse clicking.

The window 78 presents a menu that is used to select the images for forming the displayed stack 50 within the window 66. In the illustrated example, the images are stored in a folder 84 and the first-listed image (i.e., HOUSE 1) has been designated as the first image in the displayed stack 50. The designated image and the following four images in the folder 84 are used to form the stack. The next five images can be used to form a "next" stack by positioning the cursor 62 in window 66 over the icon 68 for the set period of time. As an alternative, the first stack may be designated by selecting a folder in which the files are stored. Thus, by designating the folder 84, the first image files in the folder will be used to form the stack 50. As a user option, the selection of the image files from an image library may be arbitrary. That is, rather than a stack that directly reflects the order of files within the folder 84, there may be a degree of randomness in the selection of files for forming the stack.

The window 80 may be used to transfer or organize the stored images. For example, the third-level image 82 within the window 76 may be transferred to the folder 86 in the window 80. Drag-and-drop techniques may be used to transfer the image 82 from the window 76 or to transfer the corresponding file designation from the window 78. However, in the preferred embodiment, the manipulation of images can occur without moving the cursor 62 from the window 66. A combination of computer mouse operations and/or a keystroke may be used to enter one of the images 52–60 of the stack 50 into the folder 86. In this application of the invention, the stack 50 is used for selecting files that are of interest to the user. The image files within a folder having a large library of images can be sorted into a number of more manageable folders by segregating the images on the basis of content (e.g., family pictures, work-related pictures, etc). Instead of sorting, the selected images may be duplicated as a result of selections triggered within window 66. For example, the window 80 in which folder 86 resides may be a window for an auxiliary or a removable storage device. Thus, the invention may be used for its browsing-selection capability in addition to its browsing-viewing capability.

In one alternative application of the invention, the images 52–60 are thumbnail images of video clips. The thumbnail images can be browsed in the same manner as described with reference to the scrolling of digital photographs from a digital camera. However, when a particular thumbnail image is designated for loading into the window 76, the video clip is automatically run in the window.

In another alternative embodiment, the images 52–60 in the stack 50 are representative of text documents. The images represent display information for the different text documents. This browsing approach is particularly useful if the text documents include banners or other features that distinguish one document from another.

Figure 5:
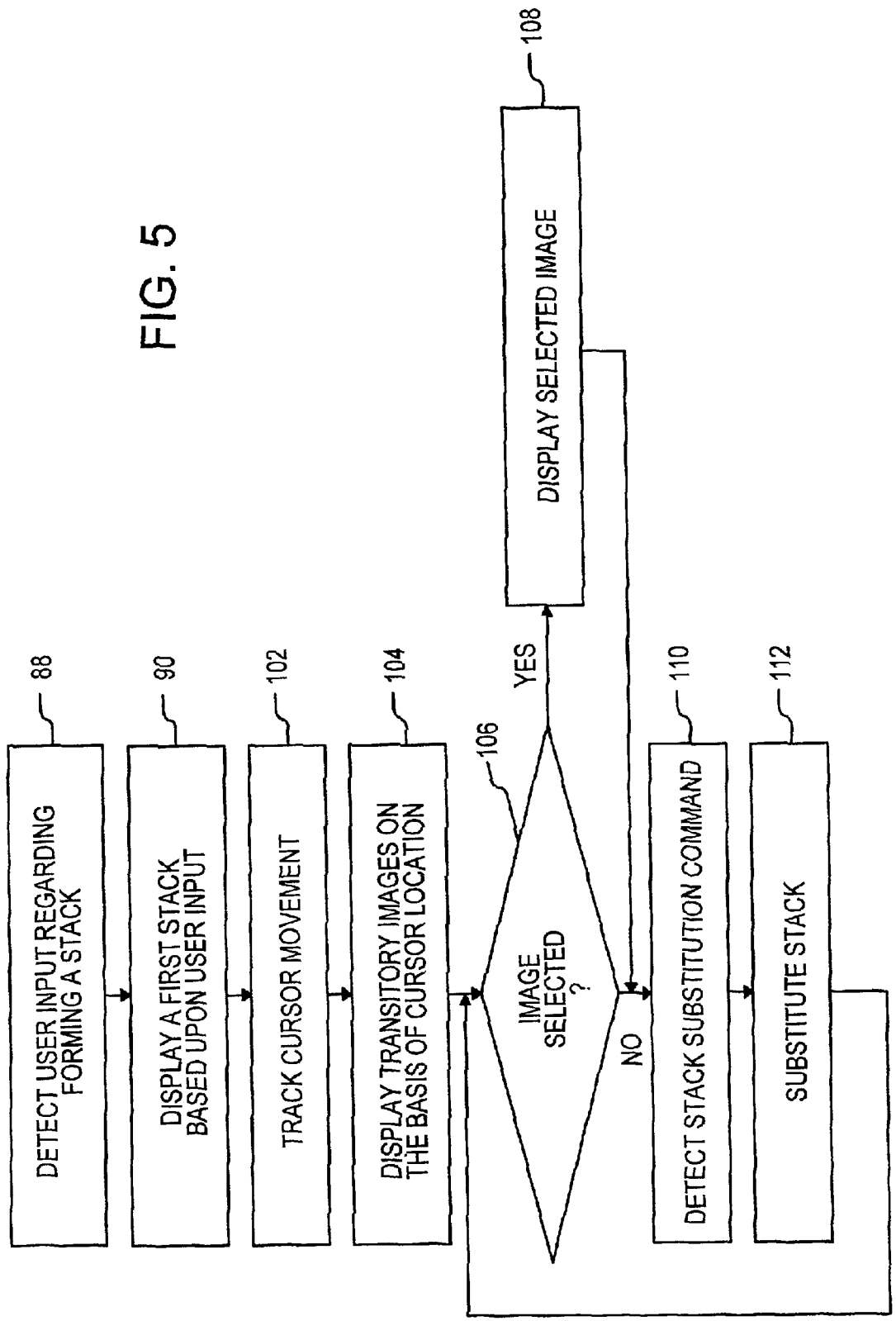
FIG. 5 is a process flow of steps that may be followed in accordance with the invention.
Figure 6:
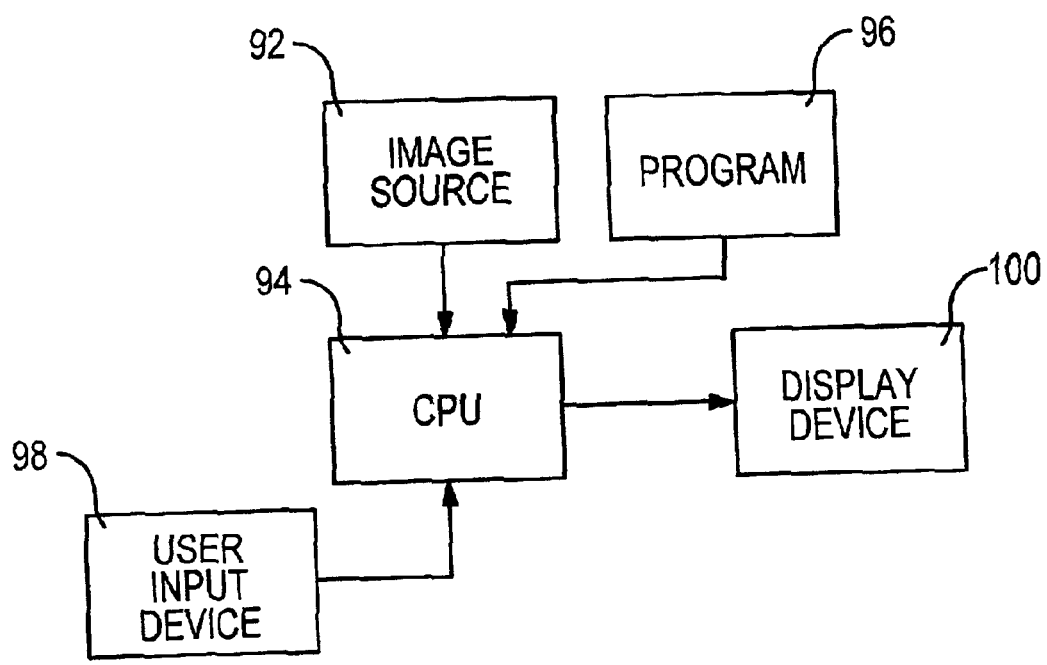
FIG. 6 is a simplified block diagram of components for implementing the invention.

The operations of the invention will be described with reference to FIGS. 4, 5 and 6. FIG. 5 is an example of a process flow of steps, while FIG. 6 is a simplification of the components for implementing the steps. At step 88, the system detects an input from a user regarding forming a stack.

In FIG. 4, the image labeled "HOUSE 1" is selected from the window 78 for forming the displayed stack 50, as indicated at step 90. The selected image is positioned as the first image in the displayed stack. As previously noted, the user input may be a selection of a folder rather than an image and/or may include a degree of randomness in the selection of available images for forming the stack. In FIG. 6, the images are stored in the image source 92. The source may be a hard drive of a computer or may be a storage at a remote site, with the images being accessible via a network, such as the Internet. For applications in which only the windows 66 and 78 are available, the process steps may be implemented entirely within the digital camera that is used to form the images. In this embodiment, the image source 92 is the memory of the camera.

At least one central processing unit (CPU) 94 is used to execute the necessary instructions. The CPU is connected to a program 96, which is stored in non-volatile memory. The user input device 98 may be any one of or a combination of known devices for manipulating a cursor, such as a computer mouse, a trackball or a keyboard. The graphical user interface of FIG. 4 is presented on a display device 100, such as a monitor.

The movement of a cursor across the display device 100 is tracked by the CPU 94, as indicated at step 102 in FIG. 5. As a result, the system will be able to detect when the cursor 62 of FIG. 4 is positioned over one of the images 52–60 in the stack 50. When the cursor is positioned over one of the images, the transitory second-level image 64 is presented. This display step 104 allows the user to efficiently browse through the images.

The use of the window 76 is not critical to the invention. If the third-level image 82 is desired, the process includes a decision step 106 of determining whether an image has been selected. One acceptable mechanism for selecting the image may be "clicking" the computer mouse that controls the cursor 62. The selection of an image generates the third-level image 82, as indicated at step 108. The selection may also be used to duplicate or move the image file to another folder, to print the image, or to otherwise manipulate the selected image or image file. The method also includes the step 110 of detecting when the user has generated a command to change the stack. The command may be a result of selecting another image from the window 78 or may be the result of using the incrementing icon 68 or the decrementing icon 70. As previously described, merely by positioning the icon 62 over the incrementing icon 68, a transitory image is formed for each of the first-level images 52–60 in the stack 50 before the stack is substituted at step 112 to present a different subset of images that will be scrolled with respect to generating the transitory images. In such a sequence, the step 104 of displaying the transitory images on the basis of cursor location results in all of the transitory images being generated as a result of the location of the cursor on the incrementing icon 68.

As will be well understood by persons skilled in the art, the sequence of steps shown in FIG. 5 may be varied without diverging from the invention. Moreover, the diagonal arrangement of images 52–60 in the stack 50 of FIG. 4 is not critical. Any other overlapping arrangement that conserves display real estate may be substituted. However, an advantage of the diagonal arrangement is that the cursor 62 may be moved in a straight line to sequentially generate a transitory image for each one of the first-level images.

While the invention has been described primarily with respect to browsing image files within a computer or digital camera, applications within other equipment have been contemplated. For example, the graphical user interface may be a liquid crystal display (LCD) of a digital printer having a number of documents that are stored in memory. The images that represent the documents may be the first-level images that are browsed in the manner described with reference to FIGS. 1–6. As the first-level images are browsed, second-level transitory images are presented. Selecting a particular image causes the corresponding document to be identified as the document to be printed.

Figure 7:
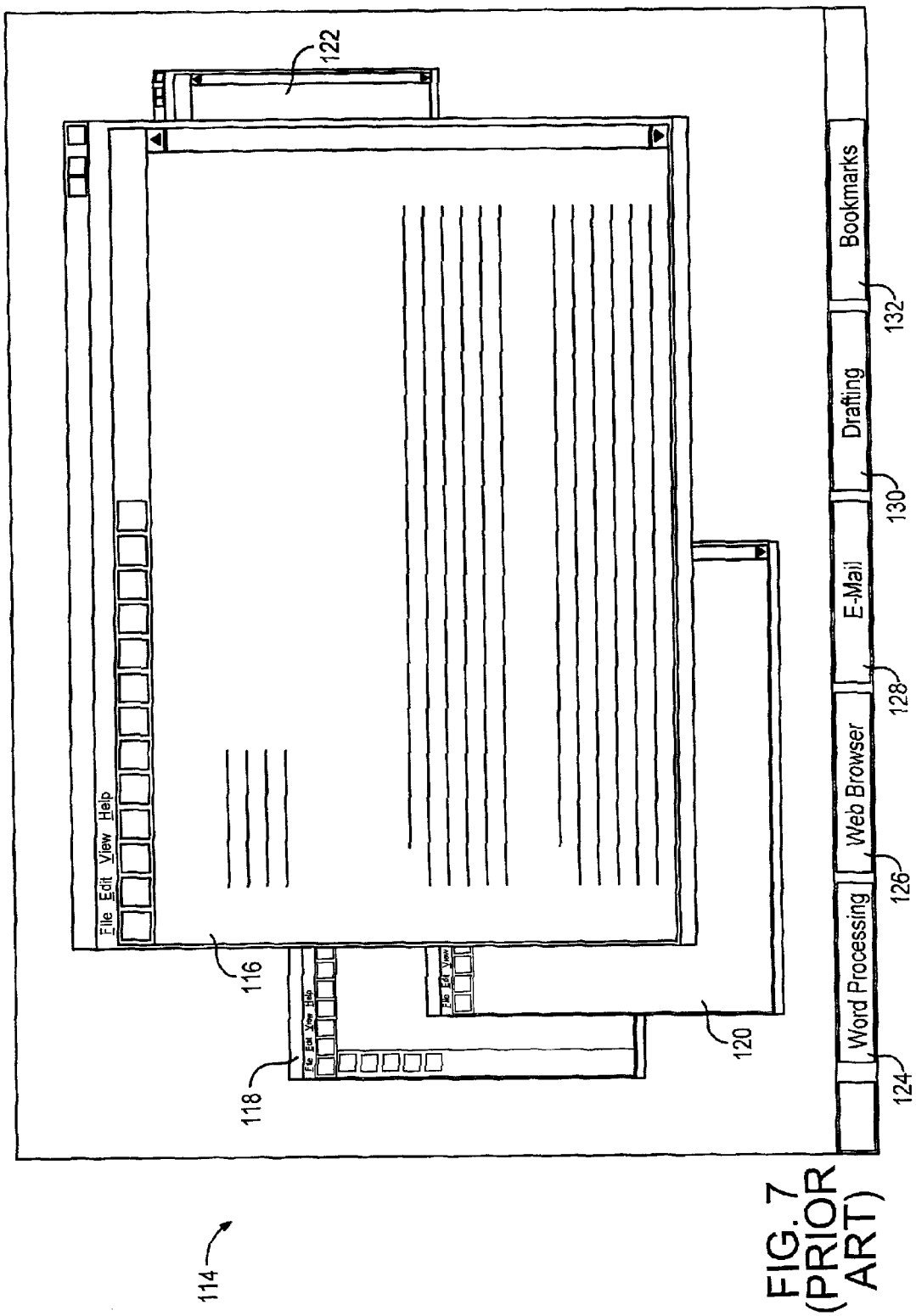
FIG. 7 is an illustration of a number of open desktop windows on a computer monitor, in accordance with the prior art approach.

In another contemplated embodiment, the invention is used to browse through computer windows. The conventional approach is illustrated in FIG. 7. A display 114 shows four opened windows 116, 118, 120 and 122. In a lower portion of the display 114 are five icons 124, 126, 128, 130 and 132. Each icon 124–132 corresponds to an open window. Five icons are present, but only four open windows are shown, since one window is entirely covered by the apparent windows. In the display of FIG. 7, the "forward" window is window 116. However, by clicking on any one of the five icons, the corresponding window is moved to the "forward" position. This procedure works well if the information on the icons easily distinguishes one window from the other windows and when the number of open windows is sufficiently low that the information on the icons is apparent. As the number of open windows increases, the available spacing for the icons decreases.

Figure 8:
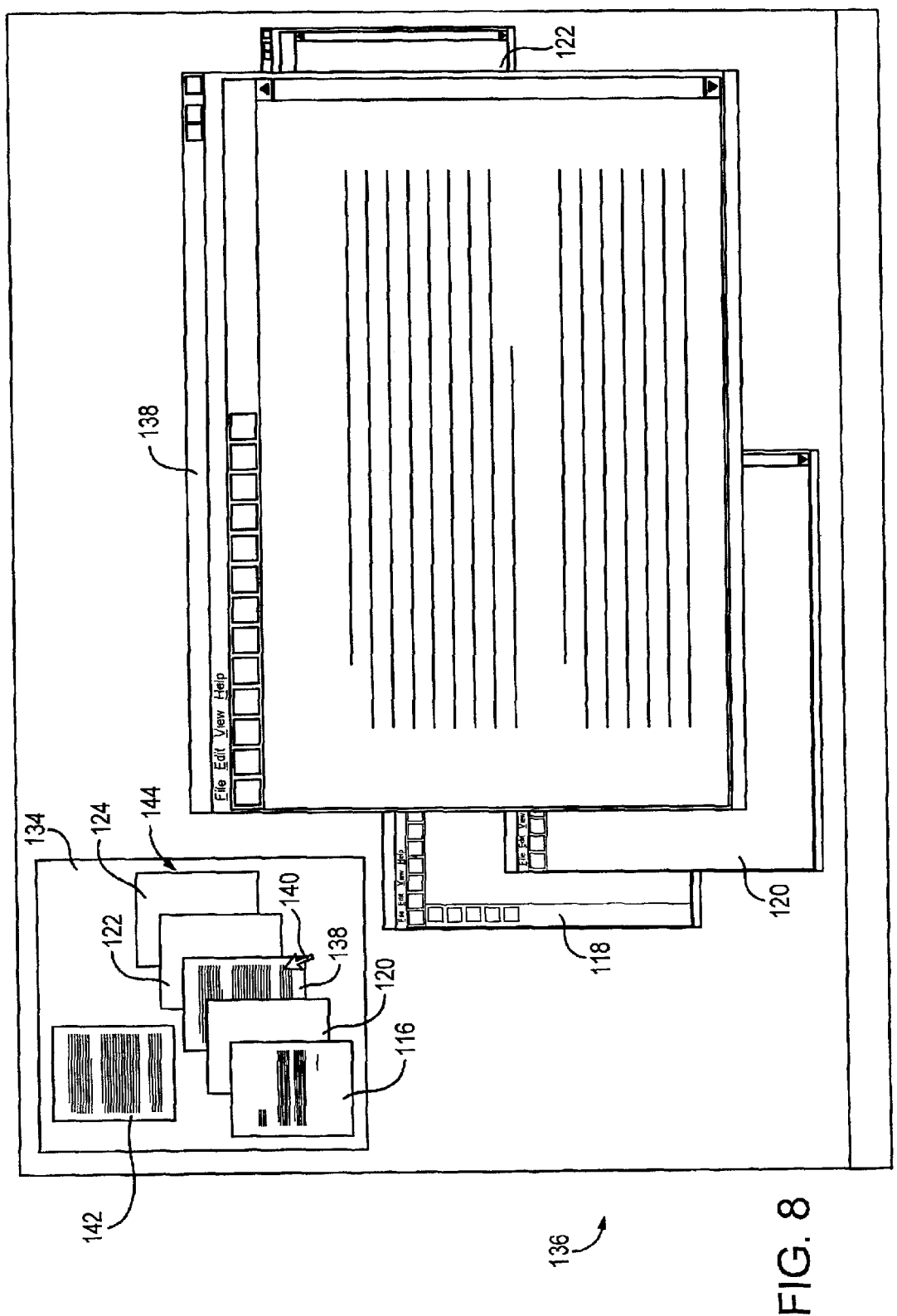
FIG. 8 is an illustration of the computer monitor of FIG. 7, but with a window browsing stack in accordance with the present invention.

Referring now to FIG. 8, in accordance with this embodiment of the invention, a window-browsing region 134 of a display 136 includes display information for the various open windows. Thus, the window 138 that was not apparent in FIG. 7 is represented in the window-browsing region 134 of FIG. 8. In fact, it is this window that is indicated by the hovering of the cursor 140, so that a transitory second-level image 142 is formed for the window 138. By selecting the first-level image in the stack 144, the window 138 is moved to the "forward" position within the display 136. This provides an easily manipulated process for identifying the open windows and selecting one of the windows.

As an alternative embodiment of FIG. 8, the movement of the cursor 140 over one of the icons in the stack 144 may automatically move the corresponding window 116–122 to the "forward" position within the display 136. That is, the transitory window 142 is not critical. In another application, the stack 144 of icons within the window-browsing region 134 represents display information for documents or applications which have not been opened. Thus, the icons within the stack 144 may be display information for various applications within a "Start" list or may be documents that are available using a particular program, such as a word processing program.

What is claimed is:

1. A method of accessing memory-stored items that are available via a system comprising the steps of:

displaying a stack of partially overlapping images that are directly representative of display information of a plurality of said memory-stored items, including presenting only a portion of said display information for each said image that is overlapped by another said image in said displayed stack;

automatically tracking movement of a display icon across said displayed stack;

revealing an increased portion of each said image in response to detecting that said display icon is positioned in alignment with said image, said revealing being triggered independently from user-initiated designations other than said movement of said display icon, thereby enabling sequential presentations of said images as an automated response to scanning said display icon across said displayed stack along a path in which said display icon is moved into sequential alignment with said images; and presenting file information regarding said memory-stored items, said file information presentations being implemented separately from but in correspondence with said revealing said increased portions of said images as said display icon is moved, said file information including at least one of file name, stored location and file size.

2. The method of claim 1 wherein said step of displaying said displayed stack includes presenting only a minor portion of each image, with an exception of a foremost image in said displayed stack, said memory-stored items being Image documents, wherein each said sequential presentation of said increased portions of said images is an automated response that is based merely on positioning of said display icon so as to sequentially vary said foremost image during said scanning, said display icon being a cursor.

3. The method of claim 1 wherein said images in said displayed stack are a subset of available images in storage, said method further comprising the stops of:
presenting an incrementing icon and a decrementing icon;
enabling subset-to-subset incrementing forward within said storage of images in response to detecting that said display icon has been in alignment with said incrementing icon for a set period of time; and
enabling subset-to-subset decrementing rearward within said storage of images in response to detecting that said display icon has been in alignment with said decrementing icon for said set period of time;
wherein said subset-to-subset incrementing and decrementing triggers displays of different stacks of said available images in said storage.

4. The method of claim 3 further comprising a step of scrolling through each said image in said displayed stack during said set period of time, including revealing each said image in entirety during said set period of time before a different stack is displayed.

5. The method of claim 1 wherein said steps of displaying and revealing are directed to a first window area of a display screen, said method further comprising opening a specific memory-stored item in response to a selection of a specific image in said displayed stack, said specific memory-stored item being directly related to said specific image, said opening of said specific memory-stored item occurring in a second window area of said display screen.

6. The method of claim 5 wherein said step of displaying said stack of images includes presenting thumbnail images from video files and wherein said step of opening said specific memory-stored item includes running a specific video file when a directly related thumbnail image is selected.

7. The method of claim 1 wherein said step of revealing increased portions of said images includes generating pop-up images above said stack as said display icon is moved into alignment with said images in said displayed stack, said revealing further including preserving said images in said displayed stack such that said displayed stack remains intact while said pop-up images are generated.

8. The method of claim 1 wherein said steps of displaying, tracking and revealing are implemented from a web page of the World Wide Web.

9. The method of claim 1 further comprising a step of enabling manipulation of file storage and transfer in response to user-initiated designations directed toward said displayed stack, including enabling changes in storage of said memory-stored items within different folders as a consequence of manipulations of said images.

10. A computer system comprising:
a display device;
a source of image files;
at least one processor enabled to manipulate said image files from said source for visual presentation at said display device;
a cursor-control device and an operatively associated driver program accessible by said at least one processor to manipulate movement of a cursor along said display device; and
computer programming accessible by said at least one processor to provide instructions for manipulating said image files from said source, said computer programming being cooperative with said at least one processor to:
generate a display of a stack of said image files at sold display device such that said stack includes overlapping representations of image data of a plurality of associated said image files from said source, and respond directly to alignment of said cursor with said display of said stack by generating a user-selected image of a representation on which said cursor resides, each sold user-selected image being misaligned with respect to said representations in said stack and being a full-file display of said image data of the specific image file associated with sold representation on which said cursor resides;
wherein said computer programming includes a cursor-detection module that is sensitive to positioning of said cursor to generate said user-selected image based merely on said positioning of said cursor and further includes an image-loading module that initiates an opening of said specific image file associated with said representation in response to a second user-initiated designation that is triggered by operation of said cursor-control device, wherein said opening is executed separately from said generation of said user-selected image.

11. The computer system of claim 10 wherein said source of images is a stored library of digital photographs.

12. The computer system of claim 10 wherein said cursor-control device is one of a computer mouse and a trackball device.

13. The computer system of claim 10 wherein said computer programming further includes a stack-incrementing module that is responsive to said positioning of said cursor (a) to sequentially scroll through said representations in said stack with respect to generating a sequence of said user-selected images and (b) to generate a succession of said stacks in which each subsequent stack is presented following said sequential scrolling through said representations in an immediately preceding stack.

14. A method of accessing stored image files comprising the steps of:
displaying an arrangement of thumbnail images in which regions of rearward thumbnail images are partially covered by forward thumbnail images, said thumbnail images in said arrangement being first-level images that are full-file displays of image information from said image flies;
displaying a second-level image each time that a user-manipulated indicator is positioned in perceived contact with an exposed region of a first-level image, said displayed second-level image being at least partially offset from said arrangement and having a direct correspondence with the first-level image with which said user-manipulated indicator is in perceived contact, said displayed second-level image being said full-file display of image information of said first-level image; and
displaying a third-level image each time that a second-level image is selected, including opening the stored image file that corresponds to said second-level image which is selected.

15. The method of claim 14 wherein said first-level images, said second-level image and said third-level image are displayed simultaneously on a computer screen.

16. The method of claim 14 wherein said step of displaying said arrangement includes forming a stack of axially aligned overlapping first-level images said step of displaying said second-level image including exposing an a same window as said stack.

17. The method of claim 14 further comprising a step of presenting file information regarding the corresponding image file for each second-level image that is displayed.

* * * * *